US009120153B2

(12) United States Patent
Park

(10) Patent No.: US 9,120,153 B2
(45) Date of Patent: Sep. 1, 2015

(54) CUTTING INSERT HAVING CHIP CONTROL SURFACE WITH OUTWARDLY FACING ARCUATE CORNER PROTRUSIONS

(75) Inventor: Hong Sik Park, Daegu (KR)

(73) Assignee: Taegutec, Ltd., Daegu (KR)

( * ) Notice: Subject to any disclaimer, the term of this patent is extended or adjusted under 35 U.S.C. 154(b) by 527 days.

(21) Appl. No.: 13/559,512

(22) Filed: Jul. 26, 2012

(65) Prior Publication Data

US 2012/0294682 A1 Nov. 22, 2012

Related U.S. Application Data

(63) Continuation-in-part of application No. PCT/KR2011/000268, filed on Jan. 13, 2011.

(30) Foreign Application Priority Data

Feb. 5, 2010 (KR) .................... 10-2010-0011172

(51) Int. Cl.
*B23C 5/22* (2006.01)
*B23B 27/14* (2006.01)
*B23C 5/00* (2006.01)

(52) U.S. Cl.
CPC ......... *B23B 27/141* (2013.01); *B23B 2200/081* (2013.01); *B23B 2200/204* (2013.01); *Y10T 407/235* (2015.01)

(58) Field of Classification Search
CPC ................... B23B 2200/081; B23B 2200/087; B23C 2200/081; B23C 2200/087
See application file for complete search history.

(56) References Cited

U.S. PATENT DOCUMENTS 4,915,548 A * 4/1990 Fouquer et al. ............... 407/114
4,934,879 A   6/1990 Van Barneveld
5,122,017 A   6/1992 Niebauer
(Continued)

FOREIGN PATENT DOCUMENTS

JP    63-100107     6/1988
JP    2000 126908   5/2000
(Continued)

OTHER PUBLICATIONS

Search Report dated Sep. 21, 2011 issued in PCT counterpart application (No. PCT/KR2011/000268).

(Continued)

*Primary Examiner* — Will Fridie, Jr.
(74) *Attorney, Agent, or Firm* — Womble Carlyle

(57) ABSTRACT

A hexahedral-shaped cutting insert has a concavely curved upper surface, a lower surface, a plurality of side surfaces connecting the two, and a central hole passing through the upper and lower surfaces. Cutting edges are formed at intersections between the upper surface and the side surfaces, and corner cutting edge portions are formed at borders of two adjacent cutting edges. Cutting edge height is largest at corner cutting edge portions and smallest in the middle portions. In an inward direction of the insert from a cutting edge, the upper surface has a land portion, a downward inclined surface, a bottom surface, and a seating surface portion. A plurality of semispherical protrusions are formed on border portions between the downward inclined surface and the bottom surface, and at least one corner cutting edge portion has a corner bottom surface surrounded by an outwardly facing arcuate protrusion connecting two adjacent semispherical protrusions.

20 Claims, 3 Drawing Sheets

(56) References Cited

U.S. PATENT DOCUMENTS

| | | | |
|---|---|---|---|
| 5,282,703 | A | 2/1994 | Itaba et al. |
| 5,743,681 | A | 4/1998 | Wiman et al. |
| 8,262,324 | B2 * | 9/2012 | Park et al. ............ 407/113 |
| 2009/0226269 | A1 * | 9/2009 | Iyori et al. ............ 407/114 |
| 2011/0070039 | A1 | 3/2011 | Park et al. |
| 2011/0070040 | A1 | 3/2011 | Park et al. |

FOREIGN PATENT DOCUMENTS

| | | |
|---|---|---|
| SU | 1611583 A1 | 12/1990 |
| WO | WO 03043767 A1 * | 5/2003 |
| WO | WO 2009/001973 | 12/2008 |
| WO | WO 2009/005218 | 1/2009 |

OTHER PUBLICATIONS

Written Opinion dated Sep. 21, 2011 issued in PCT counterpart application (No. PCT/KR2011/000268).
Notice of Patent Grant dated Apr. 23, 2012 issued in Korean counterpart application (No. KR 10-2010-0011172).
Extended search report dated Jun. 5, 2015 issued in European counterpart application (No. 11739950.1).
Apraksin S.V. "Throwaway Multi-Facet Tips With a New Rake Face Form" *Soviet Engineering Research* (1984) vo. 4, No. 1, pp. 67-68.

* cited by examiner

CUTTING INSERT HAVING CHIP CONTROL SURFACE WITH OUTWARDLY FACING ARCUATE CORNER PROTRUSIONS

RELATED APPLICATIONS

This is a Continuation-in-part of International Application No. PCT/KR2011/000268, filed 13 Jan. 2011 and published in English as WO 2011/096654 on 11 Aug. 2011, which claims the benefit of Korean Patent Application No. 10-2010-0011172, filed 5 Feb. 2010. The contents of the above-identified applications are hereby incorporated by reference in their entirety.

TECHNICAL FIELD

This disclosure is related to a cutting insert mountable in a cutting tool, the cutting insert having a chip control surface.

BACKGROUND ART

In general, a machining tool mounted with a cutting insert is used in the field of cutting machining such as drilling, milling, and turning. A cutting insert used in heavy-duty machining requiring high depth of cut and feed rate experiences large vibrations caused by high cutting resistance, leading to decreased tool life. Moreover, the market nowadays demands higher productivity, so both roughing and finishing operations need to be conducted simultaneously without changing the insert. Therefore, there has been wide demand for cutting inserts which have excellent chip control for high depth of cut and feed rate as well as for small cutting conditions, and are adaptable for a wide range of machining operations for roughing and finishing, without excessively increasing the cutting resistance.

SUMMARY

The present disclosure aims to provide a single sided cutting insert having excellent chip control for heavy-duty machining and being adaptable for a wide range of machining operations for roughing and finishing without excessively increasing the cutting resistance.

A cutting insert according to the present disclosure is hexahedral-shaped and has an upper surface, a lower surface, a plurality of side surfaces connecting the upper surface and the lower surface and a central hole passing through the upper and lower surfaces. The lower surface has a flat mounting surface, and the upper surface is curved concavely over the whole area thereof and is provided with cutting edges at intersections with the side surfaces, and corner cutting edge portions formed at intersections of two adjacent cutting edges. The cutting edges are formed such that the height is largest at corner cutting edge portions and smallest in the middle portions. A land portion, a downward inclined surface, a bottom surface, and a seating surface portion are formed from the cutting edges inwards on the upper surface. A plurality of semispherical protrusions are formed on border portions between the downward inclined surface and the bottom surface, and at least one corner cutting edge portion has a corner bottom surface surrounded by an outwardly facing arcuate protrusion which connects two adjacent semispherical protrusions.

In the cutting insert according to the present disclosure, the remaining semi-spherical shaped protrusions other than those surrounding the corner bottom surface may be extended inward by an elliptic-semispherical protrusion, of which the height from the bottom surface is larger so that two-step protrusions are formed.

In the cutting insert according to the present disclosure, the height of the arcuate protrusion from the bottom surface may be smaller than that of the adjacent semispherical protrusions.

In the cutting insert according to the present disclosure, the depth of the arcuate protrusion from an imaginary surface plane defined by the cutting edges may be no more than two times that of the adjacent semispherical protrusions.

The cutting insert according to the present disclosure may further comprise a belt protrusion extension which connects the center of the arcuate protrusion to the seating surface portion along an imaginary diagonal line in the direction towards the central hole.

The cutting insert according to the present disclosure may further comprise a plurality of supplemental protrusions along the border portion between the bottom surface and the seating surface portion, wherein the supplemental protrusions and the semispherical protrusions are placed alternatingly when viewed along the cutting edges.

DETAILED DESCRIPTION

Figure 1:
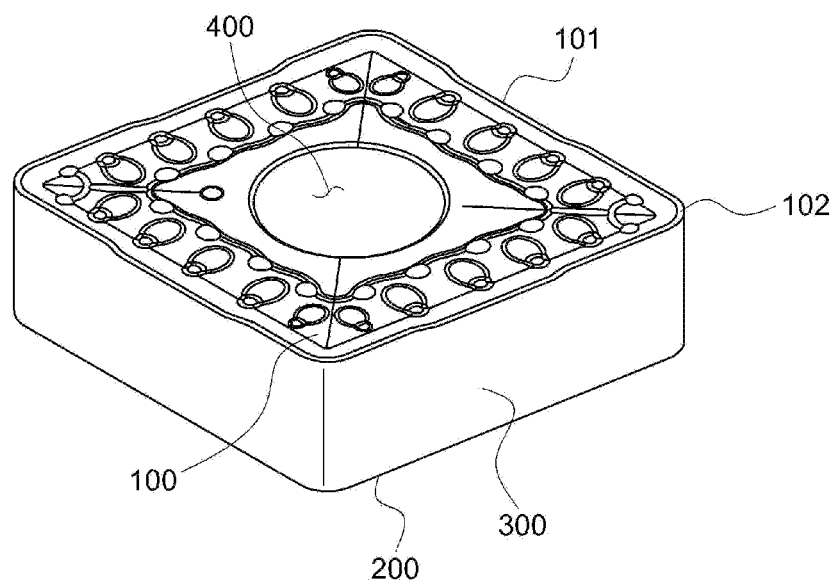
FIG. 1 is a perspective view depicting a cutting insert in accordance with the present disclosure.
Figure 2:
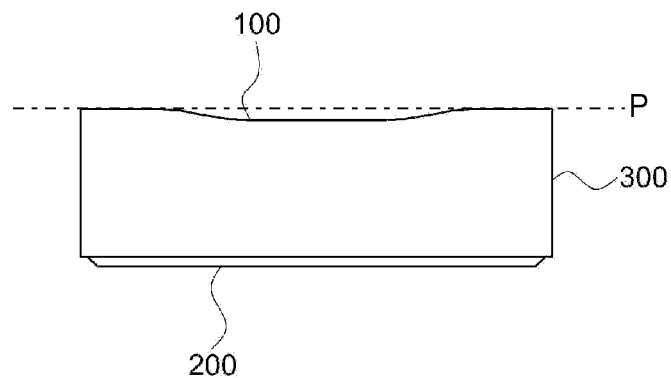
FIG. 2 is a side view of a cutting insert in accordance with the present disclosure.

Hereinafter, a cutting insert according to the embodiments of the present disclosure is described. The figures attached to the present disclosure are merely for convenience of explanation, and the shapes and the relative scales may be exaggerated or abridged.

A cutting insert according to this disclosure has an upper surface 100, a lower surface 200, a plurality of side surfaces 300 connecting the upper surface 100 and the lower surface 200, and has a hexahedral shape. The cutting insert has a central hole 400 passing through the upper and lower surfaces 100, 200.

The lower surface 200 has a flat mounting surface adaptable for heavy duty machining. Thus, the cutting insert can be considered to be a "single-sided" cutting insert.

The upper surface 100 is curved concavely over the whole area thereof, and is provided with cutting edges 101 at intersections with the side surfaces 300 and corner cutting edge portions 102 formed at intersections of two adjacent cutting edges. Since the upper surface 100 has a concave curvature over the whole area, the cutting edges also have a concave curvature accordingly, such that the height is largest at corner cutting edge portions and smallest in the middle portions. This concave curvature of the upper surface 100 allows evacuated chips to break away easily from the work-piece and lowers cutting resistance while machining.

A land portion 110, a downward inclined surface 120, a bottom surface 130, and a seating surface portion 140 are formed consecutively from the cutting edge 101 inwards on the upper surface 100. Since this surface structure is formed over the overall curvature of the upper surface 100, a uniform chip flow is obtained at various cutting depths. The seating surface portion 140 serves as an upper supporting surface when the cutting insert is mounted on a cutting tool.

A plurality of semispherical protrusions 121,122 are formed on border portions between the downward inclined surface 120 and the bottom surface 130. These semispherical protrusions 121,122 allow effective chip control at a small feed rate.

Figure 3:
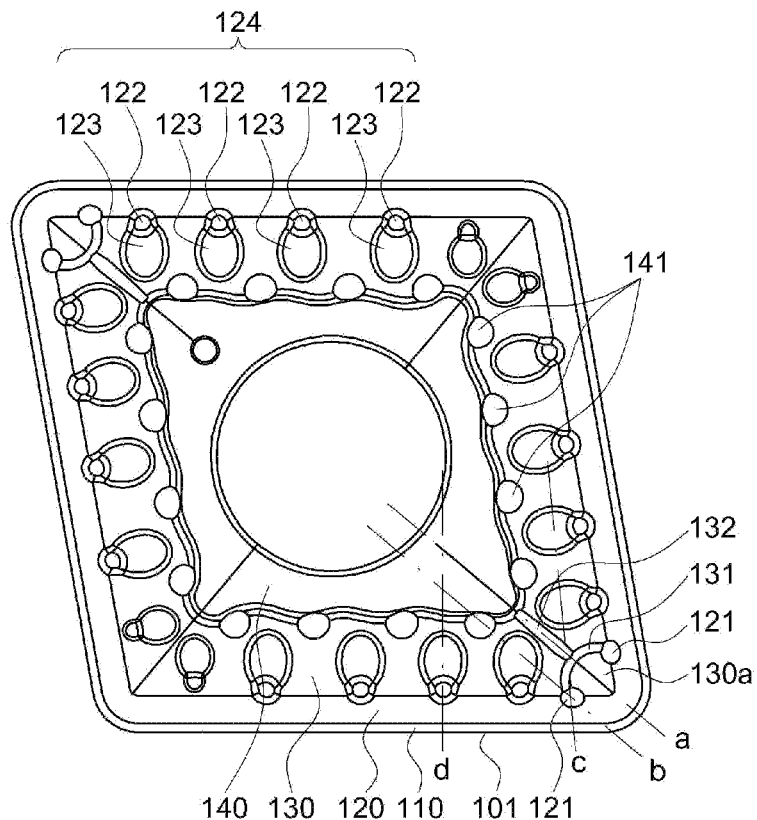
FIG. 3 is a planar view of a cutting insert in accordance with the present disclosure.
Figure 4A:
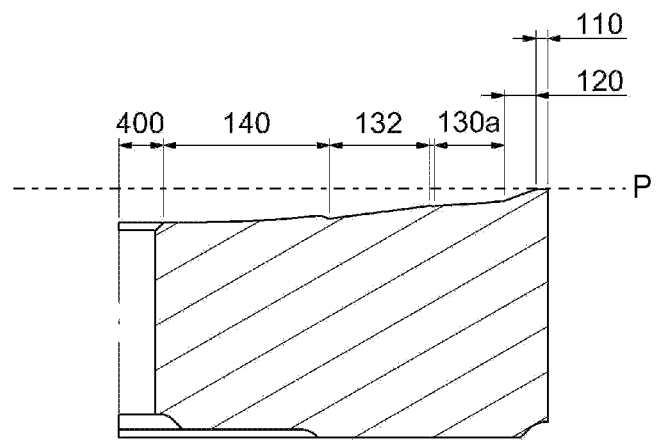
FIGS. 4a to 4d are vertical cross sectional views of the cutting insert cut along imaginary lines a to d, respectively, shown in FIG. 3.
Figure 4B:
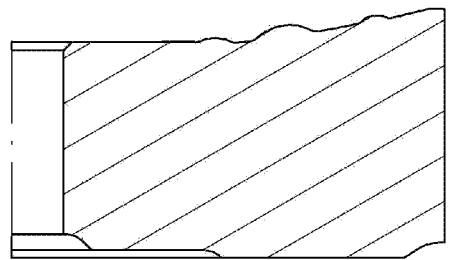
Figure 4C:
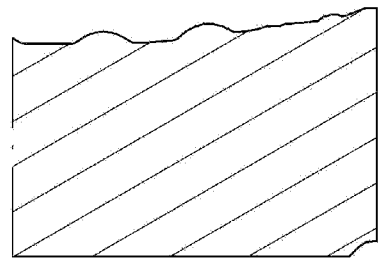
Figure 4D:
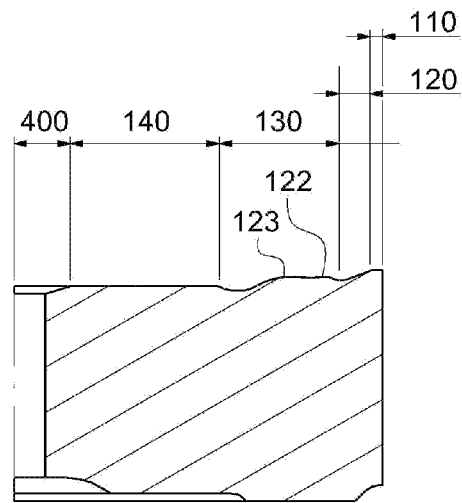

At least one corner cutting edge portion 102 has a corner bottom surface 130a surrounded by an outwardly facing arcuate protrusion which connects two diagonally symmetrical and adjacent semispherical protrusions 121 as shown in FIGS. 1 and 3. The cutting insert generally has a rhombus shape and the corner cutting edge portions 102 are formed at both diagonal corners forming an acute angle. The height of the arcuate protrusion 131 from the bottom surface 130 is preferably smaller than that of the adjacent semispherical protrusions 121. Relative to an imaginary surface plane P defined by the cutting edges 101, due to the overall curvature of the upper surface 100, the depth of the arcuate protrusion 131 from the imaginary surface is preferably no more than two times that of the adjacent semispherical protrusions 121.

The surrounded corner bottom surface 130a allows effective chip control at small depths of cut and small feed rates. Since bending stress to the chip becomes large at higher feed rates, the lower arcuate protrusion 131 can make chips curl without excessively increasing cutting resistance and so provides good chip control. If the height of the arcuate protrusion 131 is too small, curls are not formed, whereas if the height is too large, curls remain in the surrounded corner bottom surface 130a too long and cutting resistance becomes large.

The remaining semispherical shaped protrusions 122 other than those surrounding the corner bottom surface 130a may be extended inward by elliptic-semispherical protrusions 123 of which the height from the bottom surface 130 is larger so that two-step protrusions 124 are formed. While the semispherical protrusions 121,122 allow effective chip control at small feed rates, the higher elliptic-semispherical protrusions 123 of the two-step protrusions allow effective chip control at high feed rates. The two-step protrusions reduce contact area with chips and so reduce the cutting resistance and increase heat radiation through evacuated chips.

The cutting insert may include a belt protrusion extension 132 which connects the center of the arcuate protrusion 131 to the seating surface portion 140 along an imaginary diagonal line in the direction towards the central hole 400. The belt protrusion extension 132 prevents chip flow over the arcuate protrusion 131 from contact with the bottom surface 130 of the insert and so further increases the possibility of heat radiation through evacuated chips.

The cutting insert may include a plurality of supplemental protrusions 141 in a semispherical shape along the border portion between the bottom surface 130 and the seating surface portion 140, wherein the supplemental protrusions 141 and the semispherical protrusions 122 are preferably placed alternatingly when viewed along the cutting edges as shown in FIGS. 1 and 3. The supplemental protrusions 141 allow better chip control by making bigger waves of the chips at higher feed rates.

Therefore, the cutting insert according to this disclosure has excellent chip control for high depths of cut and feed rates as well as for small cutting conditions, and are adaptable for a wide range of machining operations without excessively increasing the cutting resistance.

The cutting insert disclosed above may have various other embodiments without departing from the basic concept of the present disclosure. Accordingly, all the disclosed embodiments must be understood as being exemplary only and must not be construed to be the limit of the present disclosure. Accordingly, the range of protection for the present disclosure must be determined not by an embodiment described hereinabove, but by the attached claims. An alternative that is equivalent to the attached claims is included in the range of protection of the attached claims.

The cutting insert in accordance with this disclosure allows evacuated chips to break away easily from the work-piece and lowers cutting resistance while machining.

The cutting insert in accordance with this disclosure allows effective chip control at a small feed rate as well as under heavy duty cutting conditions, without excessively increasing cutting resistance. The cutting insert in accordance with this disclosure reduces the contact area with chips and so reduces the cutting resistance and increases heat radiation through evacuated chips.

What is claimed is:

1. A hexahedral-shaped cutting insert having an upper surface, a lower surface, a plurality of side surfaces connecting the upper surface and the lower surface and a central hole passing through the upper and lower surfaces, wherein:
   the lower surface has a flat mounting surface;
   the upper surface is curved concavely over the whole area thereof, and is provided with cutting edges at intersections with the side surfaces and corner cutting edge portions formed at intersections of two adjacent cutting edges, the cutting edges formed such that cutting edge height is largest at corner cutting edge portions and smallest in middle portions thereof;
   a land portion, a downward inclined surface, a bottom surface, and a seating surface portion are formed, from the cutting edges in an inward direction of the upper surface;
   an imaginary surface plane P containing the corner cutting edge portions and parallel to the lower surface, has a height larger than that of the seating surface portion;
   a plurality of semispherical protrusions are formed on border portions between the downward inclined surface and the bottom surface; and
   at least one corner cutting edge portion has a corner bottom surface surrounded by an outwardly facing arcuate protrusion which connects two adjacent semispherical protrusions.

2. The cutting insert according to claim 1, wherein
   each of the semi-spherical shaped protrusions other than those surrounding the corner bottom surface merge with an inwardly extending elliptic-semispherical protrusion whose height from the bottom surface is larger than that of its associated semi-spherical shaped protrusions, thereby forming a two-step protrusion.

3. The cutting insert according to claim 1, wherein
   the height of the arcuate protrusion from the bottom surface is smaller than that of the adjacent semispherical protrusions to which the arcuate protrusion connects.

4. The cutting insert according to claim 3, wherein
   the depth of the arcuate protrusion from an imaginary surface plane defined by the cutting edges is no more than two times that of the adjacent semispherical protrusions to which the arcuate protrusion connects.

5. The cutting insert according to claim 1, further comprising a belt protrusion extension which connects the center of the arcuate protrusion to the seating surface portion along an imaginary diagonal line in a direction towards the central hole.

6. The cutting insert according to claim 1, further comprising a plurality of supplemental protrusions along the border portion between the bottom surface and the seating surface portion, wherein the supplemental protrusions and the semispherical protrusions are placed alternatingly when viewed along the cutting edges.

7. The cutting insert according to claim 2, wherein
the height of the arcuate protrusion from the bottom surface is smaller than that of the adjacent semispherical protrusions.

8. The cutting insert according to claim 7, wherein
the depth of the arcuate protrusion from an imaginary surface plane defined by the cutting edges is no more than two times that of the adjacent semispherical protrusions.

9. The cutting insert according to claim 2, further comprising a belt protrusion extension which connects the center of the arcuate protrusion to the seating surface portion along an imaginary diagonal line in the direction towards the central hole.

10. The cutting insert according to claim 2, further comprising a plurality of supplemental protrusions along the border portion between the bottom surface and the seating surface portion, wherein the supplemental protrusions and the semispherical protrusions are placed alternatingly when viewed along the cutting edges.

11. A hexahedral-shaped cutting insert having an upper surface, a lower surface, a plurality of side surfaces connecting the upper surface and the lower surface and a central hole passing through the upper and lower surfaces, wherein:
the upper surface is curved concavely over the whole area thereof, and is provided with cutting edges at intersections with the side surfaces and corner cutting edge portions formed at intersections of two adjacent cutting edges, the cutting edges formed such that cutting edge height is largest at corner cutting edge portions and smallest in middle portions thereof;
a land portion, a downward inclined surface, a bottom surface, and a seating surface portion are formed, from the cutting edges in an inward direction of the upper surface:
an imaginary surface plane P containing the corner cutting edge portions and parallel to the lower surface, has a height larger than that of the seating surface portion;
a plurality of semispherical protrusions are formed on border portions between the downward inclined surface and the bottom surface; and
at least one corner cutting edge portion has a corner bottom surface surrounded by an outwardly facing arcuate protrusion which connects two adjacent semispherical protrusions.

12. The cutting insert according to claim 11, wherein
each of the semi-spherical shaped protrusions other than those surrounding the corner bottom surface merge with an inwardly extending elliptic-semispherical protrusion whose height from the bottom surface is larger than that of its associated semi-spherical shaped protrusions, thereby forming a two-step protrusion.

13. The cutting insert according to claim 12, wherein
the height of the arcuate protrusion from the bottom surface is smaller than that of the adjacent semispherical protrusions to which the arcuate protrusion connects.

14. The cutting insert according to claim 13, wherein
the depth of the arcuate protrusion from an imaginary surface plane defined by the cutting edges is no more than two times that of the adjacent semispherical protrusions to which the arcuate protrusion connects.

15. The cutting insert according to claim 14, further comprising a belt protrusion extension which connects the center of the arcuate protrusion to the seating surface portion along an imaginary diagonal line in a direction towards the central hole.

16. The cutting insert according to claim 15, further comprising a plurality of supplemental protrusions along the border portion between the bottom surface and the seating surface portion, wherein the supplemental protrusions and the semispherical protrusions are placed alternatingly when viewed along the cutting edges.

17. The cutting insert according to claim 11 wherein
the height of the arcuate protrusion from the bottom surface is smaller than that of the adjacent semispherical protrusions.

18. The cutting insert according to claim 11, wherein
the depth of the arcuate protrusion from an imaginary surface plane defined by the cutting edges is no more than two times that of the adjacent semispherical protrusions to which the arcuate protrusion connects.

19. The cutting insert according to claim 11, further comprising a belt protrusion extension which connects the center of the arcuate protrusion to the seating surface portion along an imaginary diagonal line in a direction towards the central hole.

20. The cutting insert according to claim 11, further comprising a plurality of supplemental protrusions along the border portion between the bottom surface and the seating surface portion, wherein the supplemental protrusions and the semispherical protrusions are placed alternatingly when viewed along the cutting edges.

* * * * *